United States Patent [19]

Langley et al.

[11] 4,234,838
[45] Nov. 18, 1980

[54] INCREMENTAL MOTION MOTOR CONTROLLER

[75] Inventors: Lawrence W. Langley; H. Keith Kidd, both of Christiansburg, Va.

[73] Assignee: Kollmorgen Technologies Corporation, Dallas, Tex.

[21] Appl. No.: 2,797

[22] Filed: Jan. 11, 1979

[51] Int. Cl.³ .............................................. G05B 19/40
[52] U.S. Cl. .................................. 318/696; 318/685; 318/254; 318/135
[58] Field of Search ............... 318/696, 685, 138, 254, 318/701, 135

[56] References Cited

U.S. PATENT DOCUMENTS

| | | | |
|---|---|---|---|
| 3,760,252 | 9/1973 | Berry | 318/685 X |
| 4,074,179 | 2/1978 | Kuo | 318/696 |
| 4,162,435 | 7/1979 | Wright | 318/138 |

Primary Examiner—B. Dobeck
Attorney, Agent, or Firm—Morgan, Finnegan, Pine, Foley & Lee

[57] ABSTRACT

A closed loop control system for variable reluctance stepper motors which senses a voltage indicative of motion on the driven windings, uses this voltage to confirm that motion has occurred, compares this voltage with one modeled after a waveform indicative of no motion and effects successive changes in the winding drive states at optimum times.

37 Claims, 15 Drawing Figures

INCREMENTAL MOTION MOTOR CONTROLLER

BACKGROUND OF THE INVENTION

It is well known that stepping motors of all kinds exhibit instabilities at certain combinations of drive, load inertia and operating frequency. These instabilities result from the fact that the force/displacement characteristic at each cardinal position of the stepper is like a spring constant which, acting on the inertia mass of the moving part, results in a highly undamped mechanical resonance. Operation of the stepper at the resonant frequency or at harmonics of this frequency will often result in erratic performance. While there are timing methods which will uniformly accelerate and decelerate a stepping motor through its resonance frequencies, these methods are all subject to the requirement that the load must be nearly constant. A well-compensated stepping motor drive system which smoothly accelerates, slews and decelerates a given load will usually perform very badly if the load is doubled or halved.

Manufacturers and users of stepping motors have developed various techniques for controlling stepper motors in a closed-loop manner. Feedback stepper controls may be classified into two groups: (1) velocity feedback systems, in which a signal indicative of mechanical stepping rate is developed and used to modify the drive frequency; and (2) pulse position or timing feedback systems, in which an output is derived from either the motor itself or a separate transducer and used directly to control stepper drive switching. Velocity feedback is implicit in the latter systems and the response of the stepper to time varying loads is much more rapid. The most successfully known method of feedback control involves the addition of an external position measuring device such as an electro-optical transducer. Signals from the transducer are used to confirm and count steps and in some systems the transducer output is used directly to time driving pulses to the motor.

Investigators have tried to derive feedback signals directly from the windings of a stepper motor. The principal advantage of this approach would be lower costs. A secondary advantage in high performance systems would be the elimination of the inertia of a separate transducer, which can be a significant part of the total load. The problems most frequently encountered are that the windings of most stepper motors have a high degree of cross-coupling and the feedback signals are small compared with drive voltages. In conventional steppers, as the motor speed changes the relative magnitudes of these voltages vary significantly. The most successful known system is one which measures average motor current which is indicative of average motor speed because the motor back EMF reduces motor current. At least one such closed loop motor control system is commercially available. The response of such a system to load transients is extremely poor, however, because the averaging process involves a long time constant.

BRIEF DESCRIPTION OF THE INVENTION

It has been discovered that stepping motors of the type disclosed in application Ser. No. 926,311 filed July 20, 1978 and entitled "Variable Reluctance Stepper Motor" are characterized by the production of a motion dependent electrical signal that can be employed in the incremental motion motor controller of the present invention to time the drive pulses in an optimum fashion so as to achieve reliable stepper operation during acceleration, slewing and deceleration under widely varying load conditions.

Variable reluctance stepper motors characterized by such a motion dependent signal generally comprise cooperating fixed and moving structures having toothlike patterns of equal pitch but with the fixed and moving teeth having different lengths, measured in the direction of movement. The smaller teeth are divided into groups which are offset from one another by fractions of a tooth pitch to provide a bi-directional motor capable of being stepped from one position to the next with the teeth tending to produce force in the desired direction carrying essentially all of the flux and the teeth tending to produce force in the opposite direction carrying essentially no flux.

One embodiment of a linear variable reluctance stepper motor characterized by such a motion dependent signal comprises a cylindrical slider and a rod-shaped stator. The slider comprises two poles separated by a permanent magnet. Each pole comprises two sets of one or more spiral teeth separated by a winding. Each winding is continuously energized by a direct current, the direction of which is controlled. The stator comprises a toothed member having uniformly spaced spiral teeth having a pitch P and a width equal to P/2. The spiral slider teeth have a pitch P and a width equal to P/4. The slider tooth sets on each pole are offset from each other by an amount equal to $(n\pm\frac{1}{2})P$, n being an integer. The poles of the slider are offset from each other by an amount equal to $(m\pm\frac{1}{4})P$, m being an integer.

One embodiment of a disk, rotary variable reluctance stepper motor characterized by such a motion dependent signal comprises a rotor and a stator having two poles. Between the stator poles is a disk-shaped rotor having uniformly spaced radial teeth having an angular pitch P and an angular width equal to P/2. Each stator pole comprises two sets of radial teeth, the locus of each set describing a circle with a different radius. The stator teeth have an angular pitch P and an angular width equal to P/4. Associated with each stator pole is a permanent ring magnet and a winding. The sets of teeth in each stator pole are offset from each other by an angular amount equal to $(n\pm\frac{1}{2})P$, n being an integer. The stator poles are offset from each other by an angular amount equal to $(m+\frac{1}{4})P$, m being an integer. Each winding is continuously energized by a direct current, the direction of which is controlled.

One embodiment of a cylindrical, rotary variable reluctance stepper motor characterized by such a motion dependent signal comprises a rotor and a stator having two poles. The rotor is cylindrical and has longitudinally extending teeth with grooves therebetween, the rotor teeth having an angular pitch P and an angular width equal to P/2. The stator is cylindrical and surrounds the rotor. The stator has two annular poles separated by an annular magnet. Each stator pole has two sets of equally spaced, longitudinally extending teeth having an angular pitch P and an angular width equal to P/4. The sets of teeth in each stator pole are offset from each other by an angular amount equal to $(n\pm\frac{1}{2})P$, n being an integer. The two stator poles are offset from each other by an angular amount equal to $(m\pm\frac{1}{4})P$, m being an integer. The sets of teeth in each stator pole are separated by an annular winding which is continuously energized by a direct current, the direction of which is controlled.

Thus, the variable reluctance stepper motors suitable for use with the incremental motion motor controller of the present invention comprise a pair of windings continuously energized by direct currents the direction of which is controlled. The motion dependent signal employed in the incremental motion controller of the present invention is derived from that end of the winding which has most recently switched to the lower (e.g., ground) voltage. In the absence of any motion, the voltage will exhibit an unperturbed waveform which, in the case of a linear variable reluctance stepper motor, may be of the type $V=a(1-e^{-bt})$, where a and b are constants. When the stepper motor is allowed to move, however, the change in reluctance induces a transient voltage in the winding which is superimposed on the unperturbed waveform and results in a perturbed waveform. In the case of a linear variable reluctance stepper motor the perturbation may be such as might be caused if "b" in the expression $V=a(1-e^{-bt})$ were not constant but, for some time $t>0$, $b=b(t)$, first decreasing and then increasing in value. See, e.g., the lower curves in FIGS. 8A and 8B. As described in greater detail hereinafter, the incremental motion motor controller of the present invention compares the motion induced (perturbed) signal with a synthesized signal which is modeled after the no-motion (non-perturbed) waveform and which is offset from the no motion waveform in the direction of perturbation so as to control the timing of the drive pulses and achieve reliable stepper operation during acceleration, slewing and deceleration under widely varying load conditions.

BRIEF DESCRIPTION OF THE DRAWINGS

FIGS. 8A, 8B and 8C are graphical representations of typical waveforms associated with one embodiment of the incremental motion controller of FIG. 5.

DETAILED DESCRIPTION

Figure 1:
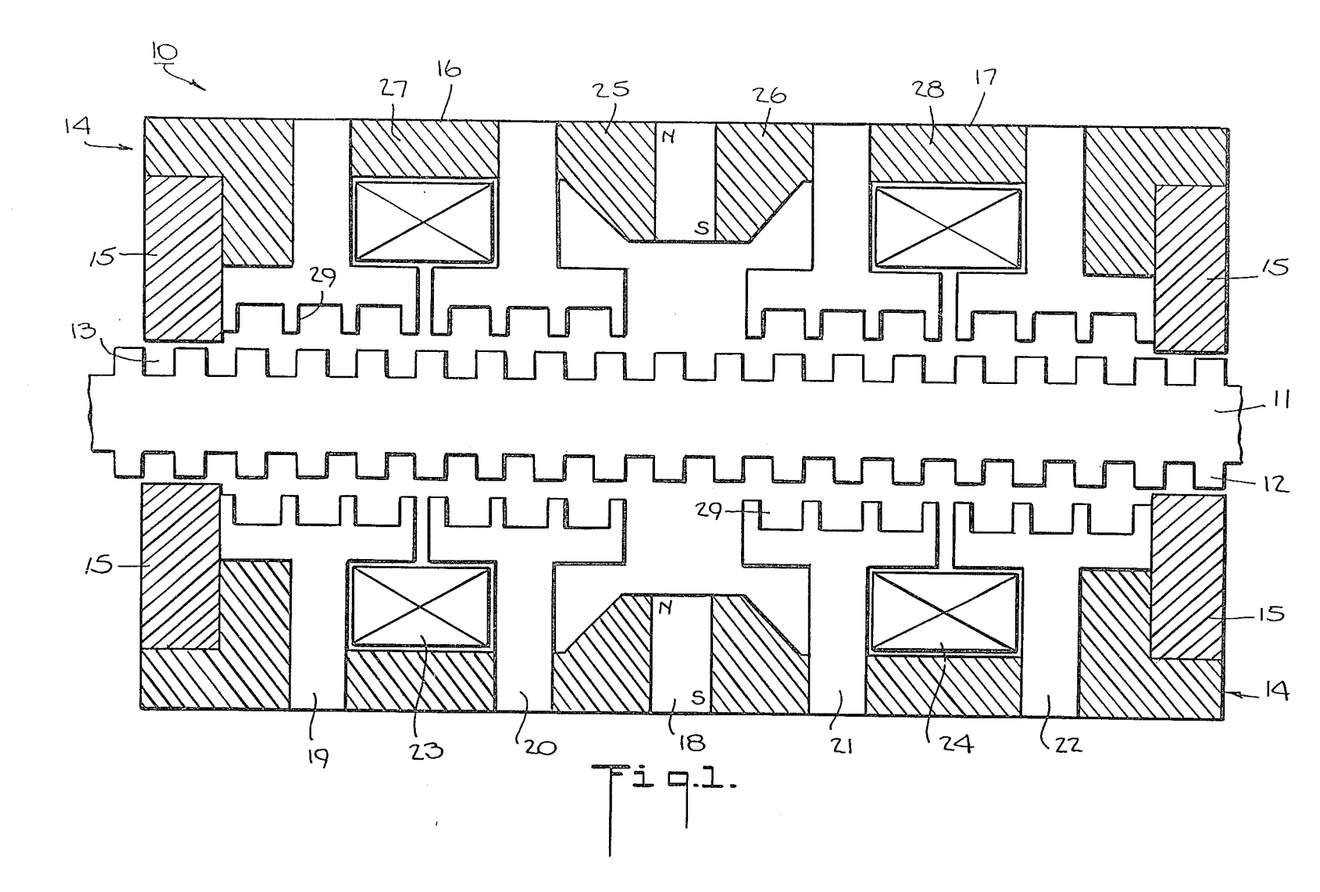
FIG. 1 is a simplified view in section of a linear, variable reluctance stepper motor for use with the motor controller of the present invention.

One embodiment of a linear variable reluctance motor useful with the incremental motion motor controller of the present invention is illustrated in FIG. 1. Linear variable reluctance motor 10 comprises a cylindrical stator 11 and an annular slider 14. Stator 11 has teeth 12 and interspersed grooves 13. The teeth have pitch P and a width P/2. Stator 11 is preferably formed from 2.5% silicon iron. Annular slider 14 slides along stator 11 on support bearings 15. Slider 14 comprises poles 16 and 17 separated by ring permanent magnet 18, preferably a samarium cobalt magnet. Pole 16 comprises two annular slider elements 19 and 20 while pole 17 comprises two annular slider elements 21 and 22. Slider elements 19 and 20 are separated by winding 23 while slider elements 21 and 22 are separated by winding 24. Between ring permanent magnet 18 and poles 16 and 17 are flux "regulators" 25 and 26. The slider elements and flux "regulators" are also formed of 2.5% silicon iron. Annular rings 27 and 28, also of 2.5% silicon iron, provide flux paths between slider elements 19-20 and 21-22, respectively.

Whereas stator teeth 12 have a pitch P and a width equal to P/2, slider teeth 29 have a pitch P and a width equal to P/4. In addition, the teeth in slider elements 19 and 20 (as well as the teeth in slider elements 21 and 22) are offset from each other by an amount equal to $(n\pm\frac{1}{2})P$, n being an integer. The teeth of poles 16 and 17 are offset from each other by an amount equal to $(m\pm\frac{1}{4})P$, m being an integer. Motor 10 is "stepped" from one linear position to the next by reversing the direction of current in one of the two control windings 23 and 24, both of which are continuously energized.

Figure 2:
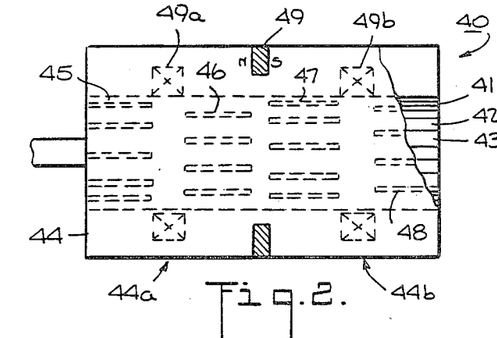
FIG. 2 is a simplified plan view, partially sectioned, of a cylindrical, rotary, variable reluctance stepper motor for use with the motor controller of the present invention.

One embodiment of a cylindrical rotary variable reluctance motor useful with the incremental motion motor controller of the present invention is illustrated in FIG. 2. Motor 40 comprises a cylindrical rotor 41 having longitudinally extending teeth 42 with grooves 43 therebetween. Teeth 42 have an angular pitch P and an angular width equal to P/2. Grooves 43 may be filled with a non-magnetic material so that rotor 41 presents a smooth outer periphery. Stator 44 is provided with two poles, 44a and 44b. Associated with each of stator poles 44a and 44b are two sets of longitudinally extending stator teeth 45-46 and 47-48. Positioned between stator teeth 45-46 and 47-48 are control windings 49a and 49b, respectively. Stator teeth 45, 46, 47 and 48 have an angular pitch P and an angular width equal to P/4. Stator poles 44a and 44b are separated from each other by ring permanent magnet 49. Stator teeth 45 and 46 (as well as stator teeth 47 and 48) are displaced from each other by an angular amount equal to $(n\pm\frac{1}{2})P$, n being an integer. Stator poles 44a and 44b are offset from each other by an angular amount equal to $(m\pm\frac{1}{4})P$, m being an integer.

Control windings 49a and 49b are continuously energized by direct currents of a magnitude sufficient to create an MMF equal to that developed by permanent magnet 49, the direction of current being selected to cause the magnetic flux developed by the control winding either to aid or oppose the magnetic flux of permanent magnet 49. The four possible combinations of current direction establish flux paths through the rotor and stator teeth which are analogous to those created in the linear stepper motor of FIG. 1. The rotary stepper motor is stepped by changing the direction of current of one of control windings 49a or 49b.

Figure 3A:
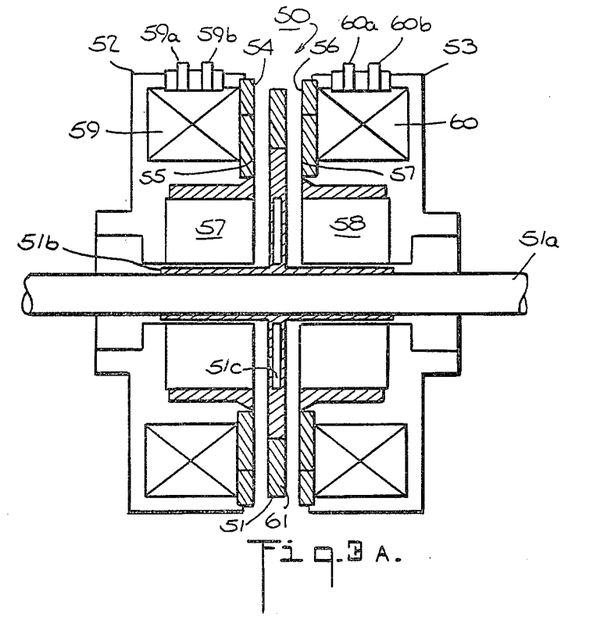
FIG. 3A is a simplified view in section of a disk, rotary, variable reluctance stepper motor for use with the motor controller of the present invention.
Figure 3B:
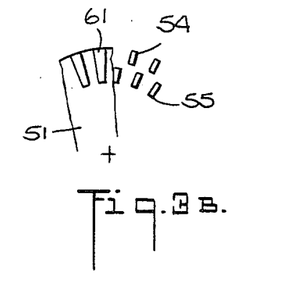
FIG. 3B is a simplified view of the tooth arrangement of the motor of FIG. 3A.

One embodiment of a disk, rotary variable reluctance motor useful with the incremental motion motor controller of the present invention is illustrated in FIGS. 3A and 3B. Motor 50 comprises a rotor 51 mounted on a non-magnetic, preferably stainless steel, shaft 51a by means of a central collar 51b, which may be made from an epoxy resin, upon which is mounted an integral soft iron ring 51c. Two stator poles 52 and 53 are disposed on opposite sides of rotor 51. Stator pole 52 comprises two sets of radial, wedge-shaped teeth 54, 55, the locus of each set describing a circle with a different radius. Stator pole 53 comprises two sets of similar stator teeth 56, 57. Associated with stator poles 52 and 53 respectively are permanent ring magnets 57 and 58 preferably of samarium cobalt. Surrounding ring magnets 57 and 58 respectively are coils 59 and 60 having leads 59a-59b and 60a-60b adapted for connection to sources of current whose direction is controllable.

Rotor 51 comprises equally spaced, wedge-shaped radial teeth 61. Rotor teeth 61 and stator teeth 54-56 are preferably made from vanadium premendur. Rotor teeth 61 have an angular pitch P and an angular width P/4. Stator teeth 54, 55 (as well as stator teeth 56, 57) are offset from each other by an angular amount equal to $(n\pm\frac{1}{2})P$, n being an integer. Stator poles 52 and 53 are offset by an angular amount equal to $(m\pm\frac{1}{4})P$, m being an integer. FIG. 3B shows the spatial relation between rotor teeth 61 and stator teeth 54, 55. Both the rotor and stator teeth are preferably embedded in epoxy rings.

The direct current continuously applied to control windings 59, 60 is of a magnitude substantially equal to the MMF of a ring-shaped permanent magnets 57 and 58, either aiding or opposing. Incremental stepping of the disk-type stepping motor is controlled by switching current direction as described earlier. Although not shown for purposes of simplicity, it should be understood that stator halves 52, 53 are typically enclosed within a non-magnetic housing.

Figure 4A:
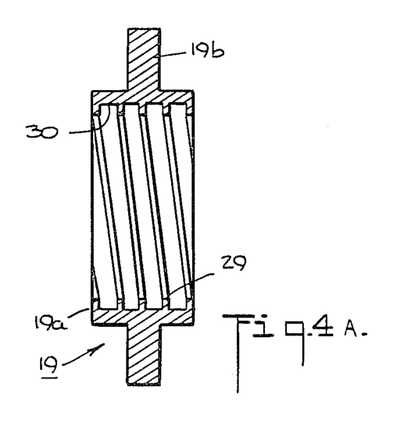
FIG. 4A is a simplified view in section of a slider element for the motor of FIG. 1.
Figure 4B:
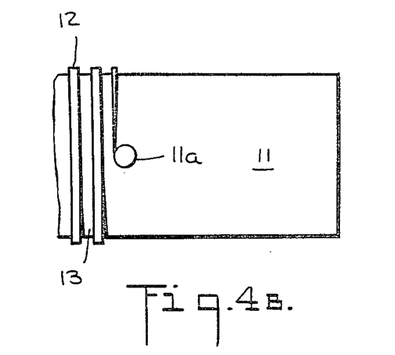
FIG. 4B is a simplified partial plan view of a stator for use with the spiral slider element of FIG. 4A.

FIGS. 4A and 4B show a spiral slider element and stator for use with the linear variable reluctnce stepper motor of FIG. 1. Spiral slider element 19 is comprised of a hollow cylindrical shell 19a having an outwardly extending circular flange 19b provided for mounting purposes. The hollow interior is provided with a tooth pattern comprised of teeth 29 arranged in a regular helix, each tooth having a pitch P and a width equal to P/4. Grooves 30 are three times as wide as teeth 29. Four spiral slider elements are employed in each motor 10 (elements 19, 20, 21 and 22 of FIG. 1). FIG. 4B shows the stator 11 having interspersed teeth 12 and grooves 13. Teeth 12 and grooves 13 have a pitch P and a width equal to P/2. Teeth 12 of the stator form a continuous helix and have square threads.

In a preferred method for fabricating stator 11 an iron bar, preferably 2.5% silicon iron, is machined on a latch and helical threads of the desired depth are cut therein. The threaded bar is then tin flashed with a very thin electro-deposit of elemental tin so as to make soldering material to the threaded bar possible. Next a tinned trip of electrically conducting, non-magnetic material is fitted into the groove 13 extending the length of the bar. This material may, for example, be copper or aluminum. The strip may be secured to the bar by a screw 11a. After the strip has been placed in groove 13 the bar is soldered, for example by dipping, so as to fill up the space around the tinned strip with solder. Next the bar is ground to a diameter slightly smaller than the desired finished diameter. It may, for example, be ground to a diameter 0.002 inches less than the desired finished diameter. The ground rod is now preferably copper flashed with a very thin copper coating a fraction of a thousandth of an inch thick. The ros is now plated with, for example, a thin layer of a non-magnetic material such as chromium to produce a very hard finish. When chromium is used for plating it is necessary to go through the step of copper flashing. When other plating materials such as nickel are used, the copper flashing step may be omitted.

In the finished structure support bearings 15 ride on stator 11 (See FIG. 1). Where the plating on stator 11 is hard, support bearings 15 are of a softer material. Conversely, where the surface of stator 11 is soft, the support bearing material is harder. For example, where the surface of stator 11 is very hard, e.g., chromium, support bearings 15 are preferably of an oilite sintered bronze material. Alternatively, support bearings 15 may be eliminated and the grooves between teeth 23 of the slider elements may be filled with a Teflon loaded material called "Delrin" or with a nylon loaded material called "Rulon" and employed directly in lieu of bearings 15. Where stator 11 is plated with a material which is not quite as hard as chromium, such as nickel, then support bearing 15 may be made from aluminum treated with the "Tufram" process of General Magnaplate which has the effect of oxidizing the aluminum to make polycrystalline alumina after which the voids are impregnated with Teflon. This is a very hard bearing material which has a low coefficient of friction.

It should be understood that the tooth arrangements heretofore described may be reversed in that the wide teeth or the narrow teeth may be provided on the fixed or on the moving part, the opposite tooth configuration being placed on the moving and fixed parts respectively. In addition, the permanent magnets, although preferably formed of samarium cobalt, can be formed of any suitable material. Alternatively, they may be electromagnets. Magnetic paths may be either solid or laminated and the coils may be located as shown or wound directly around the teeth to provide different coupling for their MMF's. In the linear embodiment, the cross section of the inner member need not be round but may be square, hexagonal or any other desired shape. An inner member having a round cross section is preferred because it is easier to manufacture.

The number of teeth employed and, therefore, the size of motion increments, is not limited by any ratio or formula involving pole and slot counts as is the case with vernier steppers. If the desired number of rotary steps is divisible by four two but not by four, a motor car be designed to provide directly this capability. If the desired number of steps is divisible by then the motor must have two electrical steps per design step. To provide an odd number of steps per revolution of the motor, the motor must be designed with four electrical steps per design step. In most cases, however, one to three steps can be added to the design value to simplify the design. On the other hand, linear motors can be designed to have any pitch within the practical limits of physical size and gap tolerances. Although gap tolerances should be close, they fall well within practical ranges.

Figure 5:
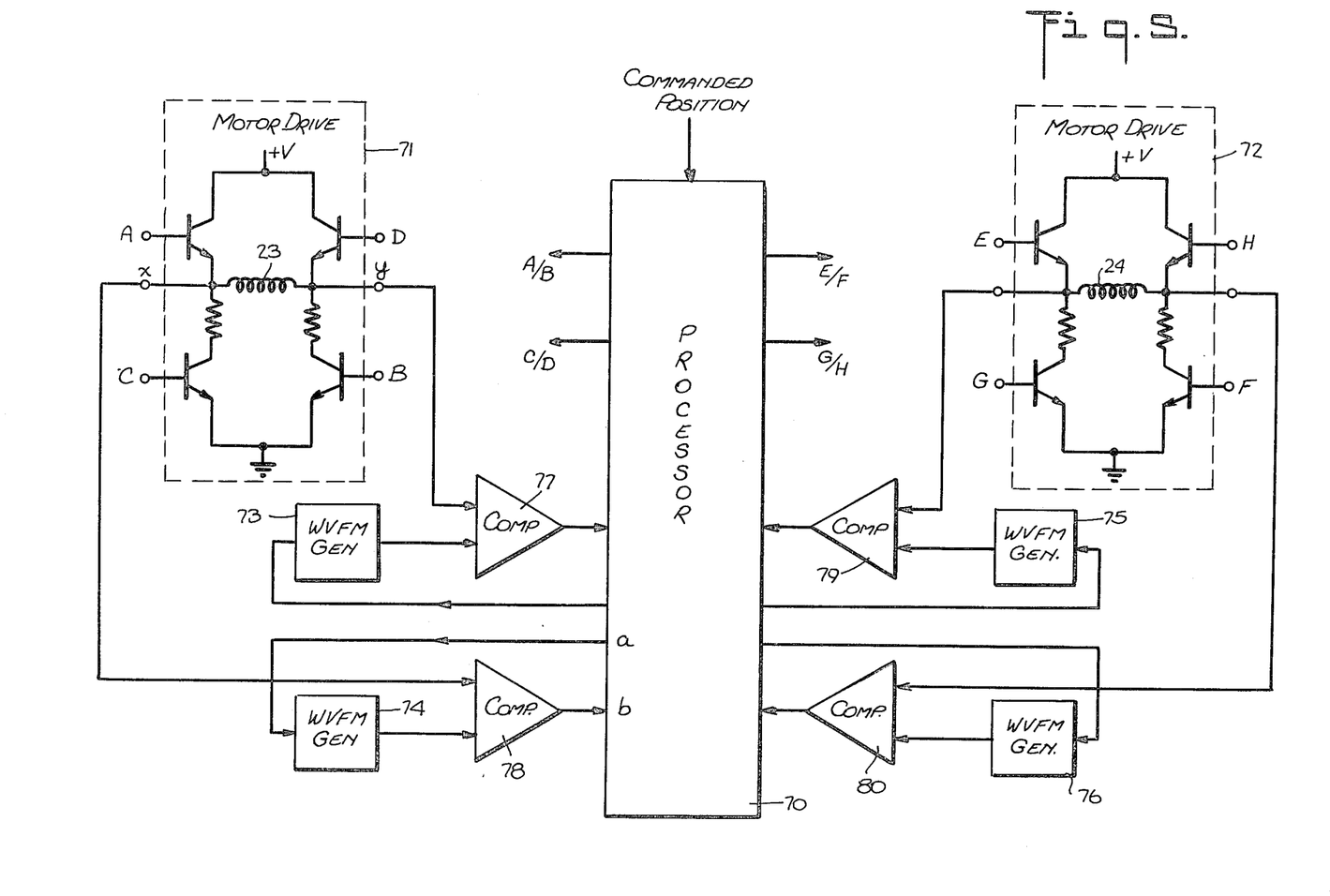
FIG. 5 is a functional block diagram of one embodiment of the incremental motion motor controller of the present invention.
Figure 6:
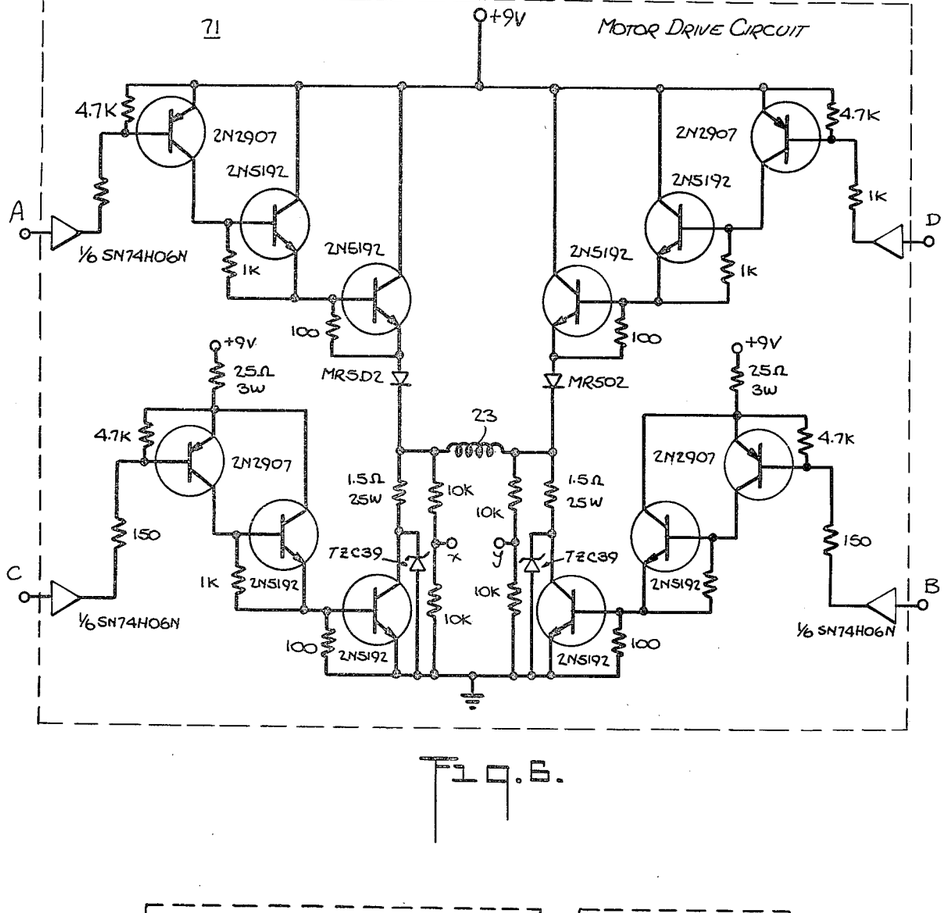
FIG. 6 is a schematic diagram of one embodiment of the motor drive circuit of FIG. 5.
Figure 6A:
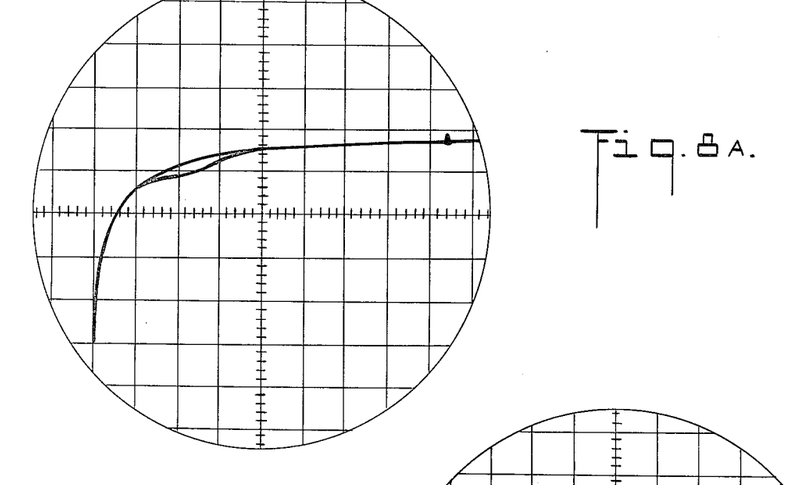
Figures 6B, 6C:
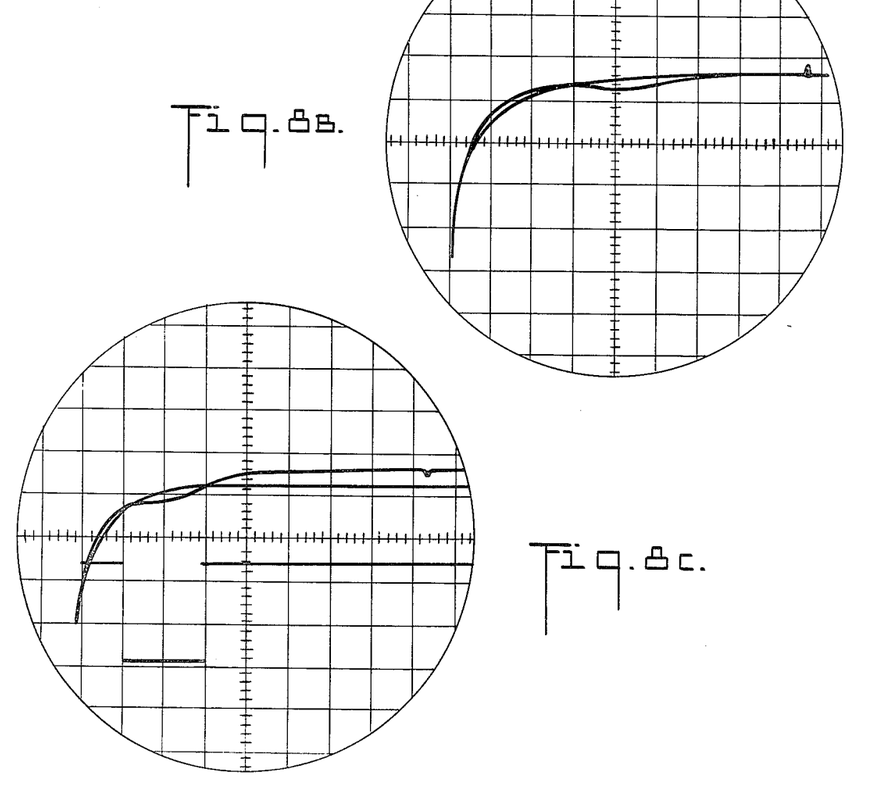
Figure 7:
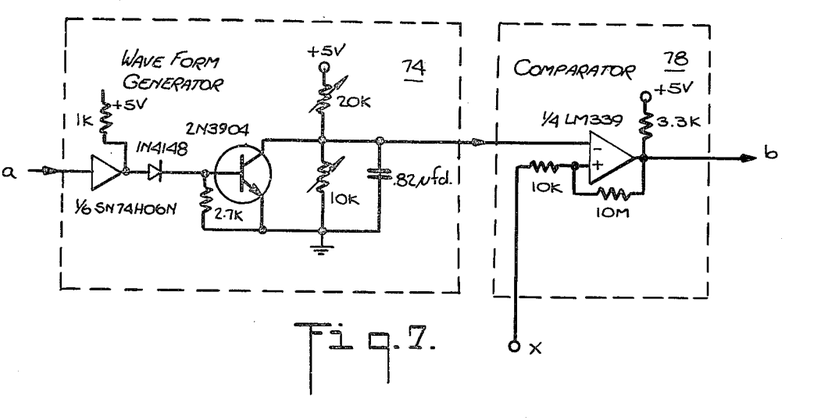
FIG. 7 is a schematic diagram of one embodiment of the function generator and comparator circuits of FIG. 5.

FIG. 5 is a functional block diagram of one embodiment of the incremental motion controller of the present invention. It comprises a processor 70, motor drive circuits 71, 72, waveform generators 73, 74, 75, 76 and comparators 77, 78, 79, 80. The motor drive circuits continuously supply direct current to the motor windings which may, for example, be windings 23 and 24 of the linear variable reluctance motor of FIG. 1. Processor 70 may, for example, be a Rockwell 6502 microprocessor. Motor drive circuit 71 may, for example, be of the type shown in FIG. 6. Waveform generator 74 and comparator 80 may, for example, be of the type shown in FIG. 7.

Each motor drive circuit comprises an H-bridge which drives its winding with essentially constant current in one of two directions. The feedback signal used to control stepper timing is derived from the end of the winding which has been most recently switched to the lower in this case (ground) voltage. At the moment of switching the winding produces an EMF that causes the diode in parallel with the lower switching transistor to conduct, and the voltage reaches approximately −1.0 volts. As the energy in the winding inductance is dissipated, this voltage rises above ground and approaches a positive voltage equal to the IR drop of the winding current through the forward resistance of the driving transistor and the resistance of the 1.5 ohm current limiting resistor. In the absence of any motion produced EMF, the voltage will exhibit an unperturbed waveform which, in the case of a linear variable reluctance stepper motor of the type shown in FIG. 1, may be of the form $V=a(1-e^{-bt})$, where a and b are constants. Such waveforms are shown, for example, in the upper curves in FIGS. 8A and 8B.

If, however, the stepper is allowed to move in response to the condition described above, then the reluctance change at the end of the motor controlled by this winding will produce a momentary EMF, superimposed on the unperturbed waveform. In the case of a linear variable reluctance stepper motor of the type shown in FIG. 1, the perturbation may be such as might be caused if "b" in the expression $V=1(1-e^{-bt})$ were not constant but, for some time $t>0, b=b(t)$, first decreasing and then increasing in value. Such perturbed waveforms are shown, for example, in the lower curves in FIGS. 8A and 8B. The lower curve in FIG. 8A, which is typical of the motion voltage produced with light load. If the stepper is more heavily loaded, however, the motion voltage will resemble that shown in the lower curve in FIG. 8B. The motion voltage occurs later, indicating a slower mechanical response to the reversal of winding current.

In the incremental motion motor controller of the present invention a signal is synthesized in waveform generators 73–76 which is modeled after the no motion (non-perturbed) waveform and is offset from the no motion waveform in the direction of the perturbation. The motion induced (perturbed) signal is compared with the synthesized signal using comparators 77–80. In the case of linear variable reluctance stepper motor of the type shown in FIG. 1, the synthesized and perturbed waveforms, together with the comparator output are shown graphically in FIG. 8C. The first crossing, indicated by the comparator output going to its low output voltage, occurs at the time which is nearly optimum for acceleration switching. The second crossing, indicated by comparator output going to its higher output voltage, occurs at a nearly optimum time for deceleration switching. Depending on the desired program of motion, one of these transitions can be used to cause reversal of the winding current at the other motor pole so that the next mechanical state is selected. That winding, in turn, will produce a motion control voltage which can be used to time the next reversal of the first winding current, and so on.

As will be readily appreciated by those skilled in the art, the waveform of the no motion signal and the motion induced signal is heavily dependent on the physical construction of the motor. In the case of other linear embodiments or in the case of rotary embodiments of the variable reluctance stepper motors disclosed herein, those waveforms may or may not be exponential in character. They might, for example, be parabolic or hyperbolic. They may even take a form which does not readily lend itself to mathematical expression. Nevertheless, such waveforms can still be synthesized in waveform generators using, for example, piecewise linear approximations, read only memories (ROM's), microprocessors or a combination thereof.

It will also be understood that those skilled in the art that if the stepper motor encounters a hard stop or an excessive load, then the motion voltage and resulting comparator outputs will not be produced and the next state of the windings will not be selected. This condition can be used to signal an overload or to stop counting and indicate the actual position reached by the stepper. A correct response to a hard stop or an excessive load is possible only with a step-by-step feedback technique. It is not possible with a velocity averaging feedback technique.

With a large but not excessive load the timing of the first crossover at the comparator input will be delayed, as shown in FIGS. 8A and 8B, and switching to the next state will be automatically delayed. The stepper will therefore automatically slow down in response to increasing load and speed up when the load is decreased or removed, and this response will occur on a step-by-step basis.

Figure 9A:
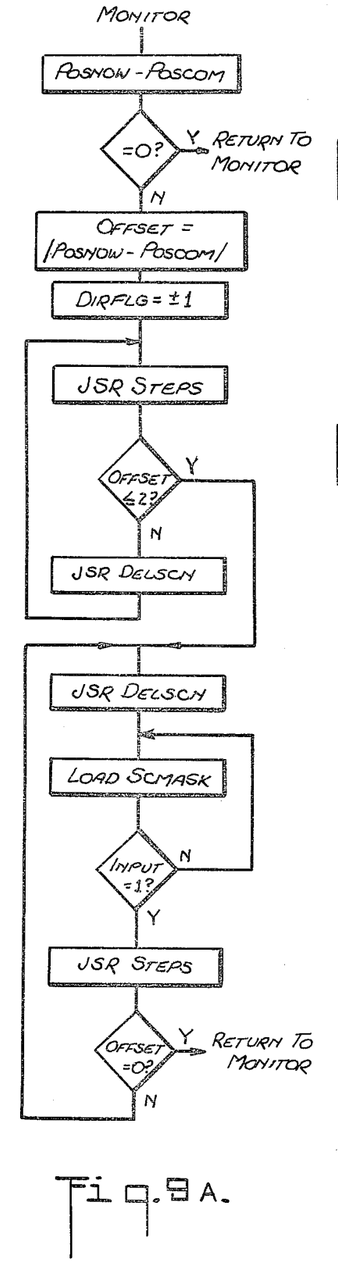
FIGS. 9A, 9B and 9C are flow diagrams of one embodiment of the programs for the processor of FIG. 5.
Figure 9B:
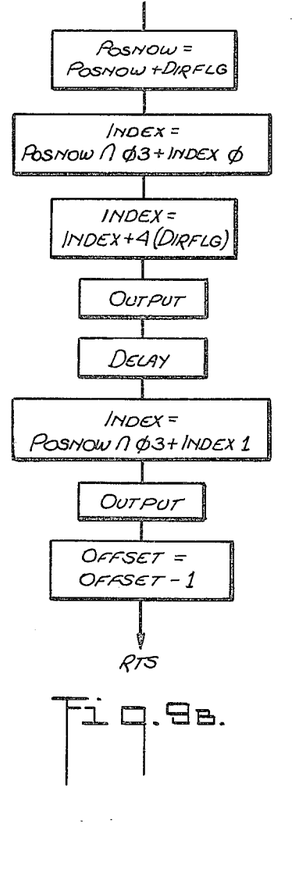
Figure 9C:
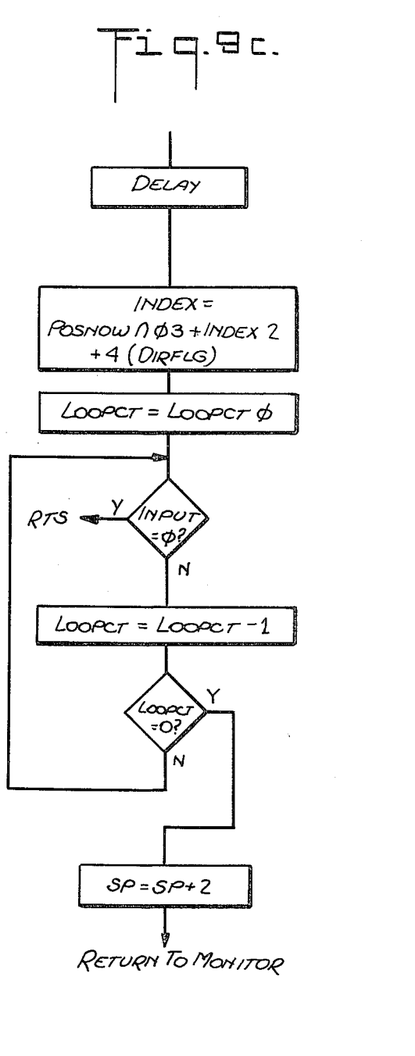

While an incremental motion motor controller could be used to control stepper motion directly, without the counting of steps, by a system which connects the comparator outputs directly to winding controls, most actual systems will require a means of step counting and a method for commanding the stepping motor to move to various positions according to a fixed or adjustable sequence. A flexible control device which can produce this type of response is a microprocessor, incorporating control programs which select the winding states and feedback signals, providing full positioning performance. The flow charts for one suitable program are shown in FIGS. 9A, 9B and 9C, with FIGS. 9B and 9C showing the "STEPS" and "DELCSN" subroutines.

The value POSNOW is the present position of the stepper motor, counted up and down as the stepper actually moves. POSCOM is the commanded new position, set at a new value before entering the program from the Monitor. The program starts by computing the difference between POSNOW and POSCOM. The flag indicating the sign of this difference is DIRFLG. The absolute difference is OFFSET, a quantity which will be counted down to zero as positioning proceeds. If OFFSET is initially zero the routine returns to Monitor. If not, the first step is taken by subroutine STEPS. After this, the program checks whether 2 steps remain and, if so, switches to a deceleration routine. If more than 2 steps remain, the DELSCN subroutine examines the selected feedback comparator for a motion signal. When it occurs, the next step is taken.

The deceleration routine uses a subroutine DELSCN also. But when the comparator has made a transition to zero, the routine continues by examining the same comparator for a transition to one. When that occurs, the next step is taken and this routine repeats until OFFSET=$\phi$.

The STEPS subroutine corrects the value of POSNOW by adding DIRFLG, which is either +1 or −1. The lowest order 2 bits of POSNOW are now masked and used to select the state of output windings to cause motion to the position POSNOW. This is done by using the low order bits of POSNOW as part of an index. After a delay the same bits are used to construct another index which selects the generator for the comparison transient. Finally, the OFFSET is decremented, and the subroutine exits.

The DELSCN subroutine initially delays action to allow the winding current transient to die down. Then an index is computed to select the proper input for feedback. The input is repeatedly scanned by a loop whose iterations are counted. If no feedback has occurred by the time initial value LOOPCT $\phi$ has been decremented to zero, the program exits to Monitor because the stepper has taken too long to move. In so doing, it must correct the stack pointer (SP) because it is jumping out of a subroutine. When the input from the comparator is found to be zero, the subroutine exits normally.

The program described is, and will usually be, part of an overall control program which communicates with a source of commanded positions and may feed back condition reports to this source. The routines described are sufficient to provide positioning response to a digital command, however, and comprise only 180 bytes.

Tests with a linear variable reluctance stepper motor of the type shown in FIG. 1 have demonstrated that under closed loop control reliable stepping rates of about 400 steps/second are readily achieved even though in an open loop mode the motor will not reliably step at over about 150 steps/second. Under closed loop control the motor has been shown to be quite insensitive to load, running from 400 steps/second down to less than 50 steps/second with increasing load, and always indicating actual steps completed after a hard stop While the incremental motion motor controller of the present invention has been described in detail in connection with linear variable reluctance stepper motor it will be appreciated by those skilled in the art that it is equally applicable to rotary disk and cylindrical rotary embodiments as well. In addition, while the program disclosed in FIGS. 9A–9C and in the Appendix adjusts the timing of current switching on the basis of position, it will be appreciated by those skilled in the art that the timing of current switching may also be adjusted on the basis of a velocity signal, derived from the time between steps. Even higher speeds may be attained by a control system which commands a position more than one step away from the dynamic position. This technique may be particularly effective where the delay in energizing windings becomes a significant limiting factor in stepper performance. Under these circumstances, the feedback signal will have to be measured on the other winding and a delay adjustment may be necessary to avoid producing reverse forces or torques.

Although two waveform generators are shown in FIG. 5 for each winding, it will be appreciated by those skilled in the art that where the no-motion waveform produced when one end of a winding is switched to the lower potential is substantially the same as when the other end of the winding is switched to the lower potential, then only a single waveform generator is needed for each winding. Similarly, only one comparator would be required for each winding if it were time shared. When employing integrated circuits, however, it is often simpler to avoid time sharing and to use multiple components, the additional size and cost being nominal.

Although unnecessary to enable persons skilled in the art to make and use the present invention, a complete program for both open loop and closed loop positioning is annexed hereto as an Appendix since that constitutes the best mode contemplated by the applicant of carrying out the invention.

Although this invention has been described with respect to its preferred embodiments, it should be understood that many variations and modifications will now be obvious to those skilled in the art. Accordingly, the scope of the invention is limited, not by the specific disclosure herein, but only by the appended claims.

APPENDIX

| Memory Location | Instruction Mnemonic | Mode | Opcode | Comments |
|---|---|---|---|---|
| 0400 | | | 00 | OPSELL |
| 0401 | | | 04 | OPSELH |
| 0402 | | | CF | STDEL |
| 0403 | | | 00 | POSCOM |
| 0404 | | | 00 | POSNOW |
| 0405 | | | 00 | DIRFLG |
| 0406 | | | 00 | OFFSET |
| 0407 | | | 00 | DELIND |
| 0408 | | | 7F | INDLD |
| 0409 | | | 1F | SENDEL |
| 040A | | | FF | SENCNT |
| 040B | | | 08 | SCMASK |
| 040C | | | 20 | GOADRL |
| 040D | | | 05 | GOADRH |
| 040E | | | 00 | TWOFLG |
| 040F | | | 00 | TWOPS 1 |
| 0410 | | | 32 | TWOPS 2 |
| 0411 | | | 03 | SEVIND |
| 0412 | | | FB | SEVPS 1 |
| 0413 | | | 9A | SEVPS 2 |
| 0414 | | | 90 | SEVPS 3 |
| 0415 | | | 50 | SEVPS 4 |
| 0416 | | | 13 | SEVPS 5 |
| 0417 | | | 09 | SEVPS 6 |
| 0418 | | | 00 | SEVPS 7 |
| 0419 | | | 7F | EXPDEL |
| 041A | | | | |
| 041B | | | | |
| 041C | | | | |
| 041D | | | | |
| 041E | | | | |
| 041F | | | | |
| 0420 | | | CC | Final Drive State 1 |
| 0421 | | | 99 | Final Drive State 2 |
| 0422 | | | 33 | Final Drive State 3 |
| 0423 | | | 66 | Final Drive State 4 |
| 0424 | | | 04 | Feedback Sensing Mask 1 |
| 0425 | | | 08 | Feedback Sensing Mask 2 |
| 0426 | | | 01 | Feedback Sensing Mask 3 |
| 0427 | | | 02 | Feedback Sensing Mask 4 |
| 0428 | | | 04 | Feedback Sensing Mask 1 |
| 0429 | | | 03 | 2 Step Delay |
| 042A | | | 04 | 3 Step Delay 1 |
| 042B | | | 03 | 3 Step Delay 2 |
| 042C | | | 04 | 4 Step Delay 1 |
| 042D | | | 05 | 4 Step Delay 2 |
| 042E | | | 03 | 4 Step Delay 3 |
| 042F | | | 04 | 5 Step Delay 1 |
| 0430 | | | 05 | 5 Step Delay 2 |
| 0431 | | | 06 | 5 Step Delay 3 |
| 0432 | | | 03 | 5 Step Delay 4 |
| 0433 | | | 04 | 6 Step Delay 1 |
| 0434 | | | 05 | 6 Step Delay 2 |
| 0435 | | | 06 | 6 Step Delay 3 |

APPENDIX-continued

| Memory Location | Instruction Mnemonic | Mode | Opcode | Comments |
|---|---|---|---|---|
| 0436 | | | 07 | 6 Step Delay 4 |
| 0437 | | | 03 | 6 Step Delay 5 |
| 0438 | | | 04 | 7 Step Delay 1 |
| 0439 | | | 05 | 7 Step Delay 2 |
| 043A | | | 06 | 7 Step Delay 3 |
| 043B | | | 07 | 7 Step Delay 4 |
| 043C | | | 05 | 7 Step Delay 5 |
| 043D | | | 03 | 7 Step Delay 6 |
| 043E | | | 04 | 8 Step Delay 1 |
| 043F | | | 05 | 8 Step Delay 2 |
| 0440 | | | 06 | 8 Step Delay 3 |
| 0441 | | | 07 | 8 Step Delay 4 |
| 0442 | | | 07 | 8 Step Delay 5 |
| 0443 | | | 04 | 8 Step Delay 6 |
| 0444 | | | 03 | 8 Step Delay 7 |
| 0445 | | | 29 | Delay Address Offset 1 |
| 0446 | | | 29 | Delay Address Offset 2 |
| 0447 | | | 2A | Delay Address Offset 3 |
| 0448 | | | 2C | Delay Address Offset 4 |
| 0449 | | | 2F | Delay Address Offset 5 |
| 044A | | | 33 | Delay Address Offset 6 |
| 044B | | | 38 | Delay Address Offset 7 |
| 044C | | | 3E | Delay Address Offset 8 |
| 044D | | | B7 | 0 - OP Reset Counters |
| 044E | | | C2 | 1 - OP Step Slow + |
| 044F | | | CD | 2 - OP Step Slow − |
| 0450 | | | D8 | 3 - OP Step Fast + |
| 0451 | | | E0 | 4 - OP Step Fast − |
| 0452 | | | E8 | 5 - OP Two Positions |
| 0453 | | | EB | 6 - OP Seven Positions |
| 0454 | | | EE | 7 - OP Feedback On |
| 0455 | | | F6 | 8 - OP Feedback Off |
| 0456 | | | 83 | 9 - OP Unused |
| 0457 | | | 6C | Intermediate Drive State 1-F |
| 0458 | | | C9 | Intermediate Drive State 2-F |
| 0459 | | | 93 | Intermediate Drive State 3-F |
| 045A | | | 36 | Intermediate Drive State 4-F |
| 045B | | | 9C | Intermediate Drive State 1-R |
| 045C | | | 39 | Intermediate Drive State 2-R |
| 045D | | | 63 | Intermediate Drive State 3-R |
| 045E | | | C6 | Intermediate Drive State 4-R |
| 045F | | | | |
| 0460 | LDA | IMM | A9 | Initialization - Entry |
| 0461 | | | FF | |
| 0462 | STA | ABS | 8D | Designate Port B - Outputs |
| 0463 | | | 01 | |
| 0464 | | | 17 | |
| 0465 | LDA | IMM | A9 | |
| 0466 | | | CC | |
| 0467 | STA | ABS | 8D | Set Output - Final State 1 |
| 0468 | | | 00 | |
| 0469 | | | 17 | |
| 046A | CLD | IMP | D8 | Clear Decimal Mode |
| 046B | LDA | IMM | A9 | |
| 046C | | | 00 | |
| 046D | STA | ABS | 8D | Designate Port A - Inputs |
| 046E | | | 03 | |
| 046F | | | 17 | |
| 0470 | STA | ABS | 8D | Set IRQ L.S.B. = 00 |
| 0471 | | | FE | |
| 0472 | | | 17 | |
| 0473 | LDA | IMM | A9 | |
| 0474 | | | 1C | |
| 0475 | STA | ABS | 8D | Set IRQ M.S.B. = 1C |
| 0476 | | | FF | |
| 0477 | | | 17 | |
| 0478 | LDY | IMM | A0 | Initialize RAM 1780 - 179F |
| 0479 | | | 20 | |
| 047A | LDA | ABY | B9 | Loop to load RAM from PROM |
| 047B | | | 00 | Loop to load RAM from PROM |
| 047C | | | 04 | Loop to load RAM from PROM |
| 047D | STA | ABY | 99 | Loop to load RAM from PROM |
| 047E | | | 80 | Loop to load RAM from PROM |
| 047F | | | 17 | Loop to load RAM from PROM |
| 0480 | DEY | IMP | 88 | Loop to load RAM from PROM |
| 0481 | BNE | REL | D0 | Loop to load RAM from PROM |
| 0482 | | | F7 | (−9) Loop to load RAM from PROM |
| 0483 | LDA | IMM | A9 | Monitor Entry - Display POSNOW |
| 0484 | | | 7F | |
| 0485 | STA | ABS | 8D | Initialize Display |
| 0486 | | | 41 | |
| 0487 | | | 17 | |
| 0488 | LDX | IMM | A2 | |
| 0489 | | | 11 | |
| 048A | LDA | ABS | AD | Fetch POSNOW |
| 048B | | | 84 | |
| 048C | | | 17 | |
| 048D | LSR | IMP | 4A | Shift 4X to display Upper byte |
| 048E | LSR | IMP | 4A | |
| 048F | LSR | IMP | 4A | |
| 0490 | LSR | IMP | 4A | |
| 0491 | JSR | ABS | 20 | Jump to KIM display subroutine |
| 0492 | | | 48 | |
| 0493 | | | 1F | |
| 0494 | LDA | ABS | AD | Fetch POSNOW |
| 0495 | | | 84 | |
| 0496 | | | 17 | |
| 0497 | AND | IMM | 29 | Mask lower byte for display |
| 0498 | | | 0F | |
| 0499 | JSR | ABS | 20 | Jump to KIM Display Routine |
| 049A | | | 48 | |
| 049B | | | 1F | |
| 049C | STX | ABS | 8E | |
| 049D | | | 42 | |
| 049E | | | 17 | |
| 049F | LDA | IMM | A9 | |
| 04A0 | | | 00 | |
| 04A1 | STA | ABS | 8D | Turn off Display |
| 04A2 | | | 41 | |
| 04A3 | | | 17 | |
| 04A4 | JSR | ABS | 20 | Jump to KIM Subroutine GETKEY |
| 04A5 | | | 6A | |
| 04A6 | | | 1F | |
| 04A7 | CMP | IMM | C9 | |
| 04A8 | | | 0A | |
| 04A9 | BCS | REL | B0 | Loop if key not 0-9 |
| 04AA | | | D8 | (−40) (Abs = 0483) |
| 04AB | NOP | | EA | |
| 04AC | NOP | | EA | |
| 04AD | TAX | IMP | AA | Transfer Key No. to |

APPENDIX-continued

| Memory Location | Instruction Mnemonic | Mode | Opcode | Comments |
|---|---|---|---|---|
| 04AE | LDA | ABX | BD | index Fetch lower byte of address for selected operation |
| 04AF | | | 4D | |
| 04B0 | | | 04 | |
| 04B1 | STA | ABS | 8D | Store in OPSELL |
| 04B2 | | | 80 | |
| 04B3 | | | 17 | |
| 04B4 | JMP | IND | 6C | Jump to selected operation |
| 04B5 | | | 80 | |
| 04B6 | | | 17 | |
| 04B7 | LDA | IMM | A9 | 0 - OP Reset Counters |
| 04B8 | | | 00 | |
| 04B9 | STA | ABS | 8D | Set POSCOM = 0 |
| 04BA | | | 83 | |
| 04BB | | | 17 | |
| 04BC | STA | ABS | 8D | Set POSNOW = 0 |
| 04BD | | | 84 | |
| 04BE | | | 17 | |
| 04BF | JMP | ABS | 4C | Return to MONITOR |
| 04C0 | | | 83 | |
| 04C1 | | | 04 | |
| 04C2 | LDA | IMM | A9 | 1 - OP Step Slow it |
| 04C3 | | | CF | |
| 04C4 | STA | ABS | 8D | Set STDEL Maximum |
| 04C5 | | | 82 | |
| 04C6 | | | 17 | |
| 04C7 | INC | ABS | EE | Add 1 to POSCOM |
| 04C8 | | | 83 | |
| 04C9 | | | 17 | |
| 04CA | JMP | ABS | 4C | Go to STEPCT Routine |
| 04CB | | | FB | |
| 04CC | | | 04 | |
| 04CD | LDA | IMM | A9 | 2 - OP Step Slow − |
| 04CE | | | CF | |
| 04CF | STA | ABS | 8D | Set STDEL Maximum |
| 04D0 | | | 82 | |
| 04D1 | | | 17 | |
| 04D2 | DEC | ABS | CE | Subtract 1 from POSCOM |
| 04D3 | | | 83 | |
| 04D4 | | | 17 | |
| 04D5 | JMP | ABS | 4C | Go to STEPCT Routine |
| 04D6 | | | FB | |
| 04D7 | | | 04 | |
| 04D8 | LDA | IMM | A9 | 3 - OP Step Fast + |
| 04D9 | | | 18 | |
| 04DA | STA | ABS | 8D | Set STDEL Minimum |
| 04DB | | | 82 | |
| 04DC | | | 17 | |
| 04DD | JMP | ABS | 4C | Finish with 1 - OP |
| 04DE | | | C7 | |
| 04DF | | | 04 | |
| 04E0 | LDA | IMM | A9 | 4 - OP Step Fast − |
| 04E1 | | | 18 | |
| 04E2 | STA | ABS | 8D | Set STDEL Minimum |
| 04E3 | | | 82 | |
| 04E4 | | | 17 | |
| 04E5 | JMP | ABS | 4C | Finish with 2 - OP |
| 04E6 | | | D2 | |
| 04E7 | | | 04 | |
| 04E8 | JMP | ABS | 4C | 5 - OP Two Position |
| 04E9 | | | 05 | |
| 04EA | | | 06 | |
| 04EB | JMP | ABS | 4C | 6 - OP Seven Position |
| 04EC | | | 1E | |
| 04ED | | | 06 | |
| 04EE | LDA | IMM | A9 | 7 - OP Turn on Feedback |
| 04EF | | | 5B | |
| 04F0 | STA | ABS | 8D | Load GOADRL |
| 04F1 | | | 8C | |
| 04F2 | | | 17 | |
| 04F3 | JMP | ABS | 4C | Return to MONITOR |
| 04F4 | | | 83 | |
| 04F5 | | | 04 | |
| 04F6 | LDA | IMM | A9 | 8 - OP Turn OFF Feedback |
| 04F7 | | | 20 | |
| 04F8 | JMP | ABS | 4C | Finish with 7 - OP |
| 04F9 | | | F0 | |
| 04FA | | | 04 | |
| 04FB | LDA | ABS | AD | STEPCT Entry - Load POSCOM |
| 04FC | | | 83 | |
| 04FD | | | 17 | |
| 04FE | SEC | IMP | 38 | |
| 04FF | SBC | ABS | ED | Subtract POSNOW |
| 0500 | | | 84 | |
| 0501 | | | 17 | |
| 0502 | BEQ | REL | F0 | OFFSET = 0? Exit (+25) |
| 0503 | | | 19 | |
| 0504 | BCS | REL | B0 | OFFSET + ? (+12) |
| 0505 | | | 0C | |
| 0506 | EOR | IMM | 49 | Complement |
| 0507 | | | FF | |
| 0508 | ADC | IMM | 69 | Correct |
| 0509 | | | 01 | |
| 050A | LDX | IMM | A2 | |
| 050B | | | FF | |
| 050C | STX | ABS | 8E | Set DIRFLG = −1 |
| 050D | | | 85 | |
| 050E | | | 17 | |
| 050F | JMP | ABS | 4C | |
| 0510 | | | 17 | |
| 0511 | | | 05 | |
| 0512 | LDX | IMM | A2 | |
| 0513 | | | 01 | |
| 0514 | STX | ABS | 8E | Set DIRFLG = +1 |
| 0515 | | | 85 | |
| 0516 | | | 17 | |
| 0517 | STA | ABS | 8D | Store OFFSET |
| 0518 | | | 86 | |
| 0519 | | | 17 | |
| 051A | JMP | IND | 6C | Jump to Feedback or Non-feedback Control Routine |
| 051B | | | 8C | |
| 051C | | | 17 | |
| 051D | JMP | ABS | 4C | Exit to Next Position Delay |
| 051E | | | F7 | |
| 051F | | | 05 | |
| 0520 | CMP | IMM | C9 | NON-FEEDBACK Entry - OFFSET > 8? |
| 0521 | | | 09 | |
| 0522 | BCS | REL | B0 | Go to Long Move Routine (+21) |
| 0523 | | | 15 | |
| 0524 | TAX | IMP | AA | Prepare index for DELIND fetch |
| 0525 | LDA | ABX | BD | Fetch address of first delay |
| 0526 | | | 44 | |
| 0527 | | | 04 | |
| 0528 | STA | ABS | 8D | Store DELIND |
| 0529 | | | 87 | |
| 052A | | | 17 | |
| 052B | JSR | ABS | 20 | Go to STEPS Subroutine |
| 052C | | | 7F | |
| 052D | | | 05 | |
| 052E | BEQ | REL | F0 | Exit if OFFSET = 0 (−19) |
| 052F | | | ED | |
| 0530 | JSR | ABS | 20 | Go to DELAY Subroutine |
| 0531 | JSR | ABS | B2 | |
| 0532 | | | 05 | |
| 0533 | INC | ABS | EE | INCREMENT DELIND |
| 0534 | | | 87 | |
| 0535 | | | 17 | |
| 0536 | JMP | ABS | 4C | Loop until OFFSET = 0 |

APPENDIX-continued

| Memory Location | Instruction Mnemonic | Mode | Opcode | Comments |
|---|---|---|---|---|
| 0537 | | | 2B | |
| 0538 | | | 05 | |
| 0539 | LDA | IMM | A9 | Long Move Entry |
| 053A | | | 3E | |
| 053B | STA | ABS | 8D | Store DELIND = initial value for 8 step move |
| 053C | | | 87 | |
| 053D | | | 17 | |
| 053E | JSR | ABS | 20 | Go to STEPS Subroutine |
| 053F | | | 7F | |
| 0540 | | | 05 | |
| 0541 | JSR | ABS | 20 | Go to DELAY Subroutine |
| 0542 | | | B2 | |
| 0543 | | | 05 | |
| 0544 | INC | ABS | EE | Increment DELIND |
| 0545 | | | 87 | |
| 0546 | | | 17 | |
| 0547 | LDA | ABS | AD | Load new DELIND |
| 0548 | | | 87 | |
| 0549 | | | 17 | |
| 054A | CMP | IMM | C9 | Midpoint Delay? |
| 054B | | | 41 | |
| 054C | BNE | REL | D0 | Loop until midpoint delay reached (−16) |
| 054D | | | F0 | |
| 054E | JSR | ABS | 20 | Go to STEPS Subroutine |
| 054F | | | 7F | |
| 0550 | | | 05 | |
| 0551 | CMP | IMM | C9 | 4 Steps remaining? |
| 0552 | | | 05 | |
| 0553 | BCC | REL | 90 | Do last 4 steps decrementing DELIND (−37) offer each step Abs = 0530 |
| 0554 | | | DB | |
| 0555 | JSR | ABS | 20 | Go to DELAY Subroutine |
| 0556 | | | B2 | |
| 0557 | | | 05 | |
| 0558 | JMP | ABS | 4C | Loop until 4 steps remain |
| 0559 | | | 4E | |
| 055A | | | 05 | |
| 055B | CMP | IMM | C9 | Feedback Entry - OFFSET >2? |
| 055C | | | 03 | |
| 055D | BCC | REL | 90 | If OFFSET ≤ 2, switch to non-feedback (−59) control routine |
| 055E | | | C5 | |
| 055F | JSR | ABS | 20 | Go to STEPS Subroutine |
| 0560 | | | 7F | |
| 0561 | | | 05 | |
| 0562 | CMP | IMM | C9 | OFFSET = 2? |
| 0563 | | | 02 | |
| 0564 | BEQ | REL | F0 | Go to DECEL Routine (+6) |
| 0565 | | | 06 | |
| 0566 | JSR | ABS | 20 | Go to DELSCN Subroutine |
| 0567 | | | C4 | |
| 0568 | | | 05 | |
| 0569 | JMP | ABS | 4C | Loop until OFFSET = 2 |
| 056A | | | 5F | |
| 056B | | | 05 | |
| 056C | JSR | ABS | 20 | DECELERATION - Go to DELSCN. If input = 0 return |
| 056D | | | C4 | |
| 056E | | | 05 | |
| 056F | LDA | ABS | AD | Load SCMASK |
| 0570 | | | 8B | |
| 0571 | | | 17 | |
| 0572 | AND | ABS | 2D | AND SCMASK with Input |
| 0573 | | | 02 | |
| 0574 | | | 17 | |
| 0575 | BEQ | REL | F0 | Continue scanning until input = 1 (−8) |
| 0576 | | | F8 | |
| 0577 | JSR | ABS | 20 | Go to STEPS Subroutine |
| 0578 | | | 7F | |
| 0579 | | | 05 | |
| 057A | BEQ | REL | F0 | If OFFSET = 0, branch to Next Position Delay (+123) |
| 057B | | | 7B | |
| 057C | JMP | ABS | 4C | |
| 057D | | | 6C | |
| 057E | | | 05 | |
| 057F | LDA | ABS | AD | STEPS Subroutine - load POSNOW |
| 0580 | | | 84 | |
| 0581 | | | 17 | |
| 0582 | CLC | IMP | 18 | |
| 0583 | ADC | ABS | 6D | Use DIRFLG to modify POSNOW |
| 0584 | | | 85 | |
| 0585 | | | 17 | |
| 0586 | STA | ABS | 8D | Store new POSNOW |
| 0587 | | | 84 | |
| 0588 | | | 17 | |
| 0589 | AND | IMM | 29 | Mask two lower bits |
| 058A | | | 03 | |
| 058B | LDY | ABS | AC | Test DIRFLG |
| 058C | | | 85 | |
| 058D | | | 17 | |
| 058E | BPL | REL | 10 | Branch if N = 0 or DIRFLG + (+3) If −, increase index by 4 |
| 058F | | | 03 | |
| 0590 | CLC | IMP | 18 | |
| 0591 | ADC | IMM | 69 | Add 4 to index |
| 0592 | | | 04 | |
| 0593 | TAX | IMP | AA | Final index |
| 0594 | LDA | ABX | BD | |
| 0595 | | | 57 | |
| 0596 | | | 04 | |
| 0597 | STA | ABS | 8D | Set Intermediate Output State |
| 0598 | | | 00 | |
| 0599 | | | 17 | |
| 059A | LDA | ABS | AD | Load Exp. Delay Value |
| 059B | | | 99 | |
| 059C | | | 17 | |
| 059D | TAY | IMP | A8 | |
| 059E | DEY | IMP | 88 | Loop to Delay Start of Synthesized Exponential (−3) |
| 059F | BNE | REL | D0 | |
| 05A0 | | | FD | |
| 05A1 | TXA | IMP | 8A | |
| 05A2 | AND | IMM | 29 | |
| 05A3 | | | 03 | |
| 05A4 | TAX | IMP | AA | Prepare index for Final drive state |
| 05A5 | LDA | ABX | BD | |
| 05A6 | | | 20 | |
| 05A7 | | | 04 | |
| 05A8 | STA | ABS | 8D | Set Final Output State |
| 05A9 | | | 00 | |
| 05AA | | | 17 | |
| 05AB | DEC | ABS | CE | Decrement OFFSET |
| 05AC | | | 86 | |
| 05AD | | | 17 | |
| 05AE | LDA | ABS | AD | Load new OFFSET |
| 05AF | | | 86 | |
| 05B0 | | | 17 | |
| 05B1 | RTS | IMP | 60 | |
| 05B2 | LDA | IMM | A9 | DELAY Subroutine - load DELVAL |
| 05B3 | | | 40 | |
| 05B4 | SEC | IMP | 38 | |
| 05B5 | LDX | ABS | AE | Load DELIND |

APPENDIX-continued

| Memory Location | Instruction Mnemonic | Mode | Opcode | Comments |
|---|---|---|---|---|
| 05B6 | | | 87 | |
| 05B7 | | | 17 | |
| 05B8 | LDY | ABS | AC | Load INDLD - Outer Delay Loop |
| 05B9 | | | 88 | |
| 05BA | | | 17 | |
| 05BB | DEY | IMP | 88 | Inner Delay Loop |
| 05BC | BNE | REL | D0 | Inner Delay Loop |
| 05BD | | | FD | (−3) Inner Delay Loop |
| 05BE | SBC | ABX | FD | |
| 05BF | | | 00 | |
| 05C0 | | | 04 | |
| 05C1 | BPL | REL | 10 | |
| 05C2 | | | F5 | (−11) Outer Delay Loop |
| 05C3 | RTS | IMP | 60 | |
| 05C4 | LDX | ABS | AE | DELSCN Subroutine - Load SENDEL |
| 05C5 | | | 89 | |
| 05C6 | | | 17 | |
| 05C7 | DEX | IMP | CA | Loop to Delay Scanning of Inputs |
| 05C8 | NOP | | EA | Loop to Delay Scanning of Inputs |
| 05C9 | NOP | | EA | Loop to Delay Scanning of Inputs |
| 05CA | BNE | REL | D0 | Loop to Delay Scanning of Inputs |
| 05CB | | | FB | (−5) Loop to Delay Scanning of Inputs |
| 05CC | LDA | ABS | AD | Fetch POSNOW |
| 05CD | | | 84 | |
| 05CE | | | 17 | |
| 05CF | AND | IMM | 29 | Mask 2 L.S.B. |
| 05D0 | | | 03 | |
| 05D1 | TAX | IMP | AA | Prepare tentative index |
| 05D2 | LDY | ABS | AC | |
| 05D3 | | | 85 | Test DIRFLG |
| 05D4 | | | 17 | If +, increase index by 1 |
| 05D5 | BMI | REL | 30 | |
| 05D6 | | | 01 | (+1) |
| 05D7 | INX | IMP | E8 | |
| 05D8 | LDA | ABX | BD | Fetch SCMASK Value |
| 05D9 | | | 24 | |
| 05DA | | | 04 | |
| 05DB | STA | ABS | 8D | Store SCMASK |
| 05DC | | | 8B | |
| 05DD | | | 17 | |
| 05DE | LDX | ABS | AE | Fetch SENCNT |
| 05DF | | | 8A | |
| 05E0 | | | 17 | |
| 05E1 | LDY | IMM | A0 | |
| 05E2 | | | FF | |
| 05E3 | LDA | ABS | AD | Load SCMASK |
| 05E4 | | | 8B | |
| 05E5 | | | 17 | |
| 05E6 | AND | ABS | 2D | Read Input |
| 05E7 | | | 02 | |
| 05E8 | | | 17 | |
| 05E9 | BEQ | REL | F0 | Branch if Input = 0 Take next step |
| 05EA | | | 0B | (+11) |
| 05EB | DEY | IMP | 88 | |
| 05EC | BNE | REL | D0 | |
| 05ED | | | F5 | (−11) |
| 05EE | DEX | IMP | CA | |
| 05EF | BNE | REL | D0 | |
| 05F0 | | | F0 | (−16) |
| 05F1 | PLA | IMP | 68 | Adjust Stock pointer in prep. to abort. subroutine |
| 05F2 | PLA | IMP | 68 | Jump to Monitor |
| 05F3 | JMP | ABS | 4C | Jump to Monitor |
| 05F4 | | | 83 | |
| 05F5 | | | 04 | |
| 05F6 | RTS | IMP | 60 | |
| 05F7 | LDY | IMM | A0 | Next Position Delay - Entry 0000 |
| 05F8 | | | FF | |
| 05F9 | LDX | ABS | AE | Load STDEL |
| 05FA | | | 82 | |
| 05FB | | | 17 | |
| 05FC | DEX | IMP | CA | |
| 05FD | BNE | REL | D0 | |
| 05FE | | | FD | (−3) |
| 05FF | DEY | IMP | 88 | |
| 0600 | BNE | REL | D0 | |
| 0601 | | | F7 | (−9) |
| 0602 | JMP | ABS | 4C | Jump to Monitor |
| 0603 | | | 83 | |
| 0604 | | | 04 | |
| 0605 | LDX | IMM | A2 | Two Position Routine - Entry 000E |
| 0606 | | | 00 | |
| 0607 | CPX | ABS | EC | Is TWOFLG = 0 |
| 0608 | | | 8E | |
| 0609 | | | 17 | |
| 060A | BEQ | IMP | F0 | |
| 060B | | | 05 | (+5) |
| 060C | STX | ABS | 8E | Set TWOFLG = 0 |
| 060D | | | 8E | |
| 060E | | | 17 | |
| 060F | BNE | IMP | D0 | Unconditional |
| 0610 | | | D4 | (+4) |
| 0611 | INX | IMP | E8 | Set X = 1 |
| 0612 | STX | ABS | 8E | Set TWOFLG = 1 |
| 0613 | | | 8E | |
| 0614 | | | 17 | |
| 0615 | LDA | ABX | BD | Fetch next TWOPS, X |
| 0616 | | | 8F | |
| 0617 | | | 17 | |
| 0618 | STA | ABS | 8D | Store in POSCOM |
| 0619 | | | 83 | |
| 061A | | | 17 | |
| 061B | JMP | ABS | 4C | Go to STEPCT |
| 061C | | | FB | |
| 061D | | | 04 | |
| 061E | LDX | ABS | AE | Seven Position Routine - Entry 0027 |
| 061F | | | 91 | |
| 0620 | | | 17 | |
| 0621 | LDA | ABX | BD | Fetch next value |
| 0622 | | | 92 | |
| 0623 | | | 17 | |
| 0624 | STA | ABS | 8D | Store in POSCOM |
| 0625 | | | 83 | |
| 0626 | | | 17 | |
| 0627 | DEX | IMP | CA | |
| 0628 | BNE | REL | D0 | Is SEVIND = 0? |
| 0629 | | | 02 | |
| 062A | LDX | IMM | A2 | |
| 062B | | | 06 | |
| 062C | STX | ABS | 8E | Set SEVIND = 6 |
| 062D | | | 91 | |
| 062E | | | 17 | |
| 062F | JMP | ABS | 4C | Go to STEPCT |
| 0630 | | | FB | |
| 0631 | | | 04 | |

What we claim is:

1. An incremental motion motor controller for a linear, variable reluctance stepper motor comprising:
a first cylindrical motor member having a plurality of regular helical teeth with grooves therebetween, said teeth having a pitch P and a width equal to P/2;
a second cylindrical motor member surrounding at least a portion of said first member, said second member comprising two annular poles separated by an annular magnet, each pole having two annular elements separated by an annular winding, each element having a set of regular helical teeth with grooves therebetween, said teeth having a pitch P and a width equal to P/4, the sets of teeth in each pole being offset longitudinally from each other by an amount equal to $(n\pm\frac{1}{2})P$, n being an integer, said poles being offset from each other in the longitudinal direction by an amount equal to $(m\pm\frac{1}{4})P$, m being an integer, said windings characterized by no-motion signals having unperturbed waveforms and by motion-dependent signals having perturbed waveforms;

waveform generator means synthesizing waveforms modeled after said no-motion signals;

comparator means for comparing said synthesized waveforms with said motion-dependent waveforms; and means for controlling the energization of said windings in response to said comparison.

2. A motor controller according to claim 1 wherein said second motor member includes annular flux "regulators" disposed on each side of said magnet and between said magnet and each pole, the cross section of said flux "regulators" narrowing from said magnet toward each of said poles.

3. A motor controller according to claim 1 wherein said magnet is a permanent magnet.

4. A motor controller according to claim 3 wherein said permanent magnet is a rare earth permanent magnet.

5. A motor controller according to claim 1 wherein said synthesized waveform is offset in the direction of perturbation.

6. A motor controller according to claim 1 or 5 wherein said no-motion signal has an exponential waveform.

7. A motor controller according to claim 6 wherein said no-motion signal has an exponential waveform of the general type $V=a(1-e^{-bt})$, where a and b are constants.

8. A motor controller according to claim 7 wherein said motion-dependent signal has a perturbed exponential waveform of the general type $V=a(1-e^{-bt})$, where for some $t>0$, $b=b(t)$, first decreasing in value and then increasing in value.

9. An incremental motion motor controller for a disk, rotary, variable reluctance stepper motor comprising:

a disk-shaped rotor mounted on a shaft and having a plurality of wedge-shaped, radially extending equally spaced teeth having an angular pitch P and an angular width equal to P/2; and a stator comprising two poles, one disposed on each side of said rotor, each stator pole having two sets of wedge-shaped, radially extending, equally spaced teeth having an angular pitch P and an angular width equal to P/4, the locii of said sets of stator teeth describing circles having two different radii, the sets of teeth in each stator pole being offset from each other by an angular amount equal to $(n\pm\frac{1}{2})P$, n being an integer, the two stator poles being offset from each other by an angular amount equal to $(m\pm\frac{1}{4})P$, m being an integer, each stator pole also including an annular magnet and an annular winding, said windings characterized by no-motin signals having unperturbed waveforms and motion-dependent signals having perturbed waveforms;

waveform generator means for synthesizing waveforms modeled after said no-motion signals;

comparator means for comparing said synthesized waveforms with said motion-dependent waveforms; and means for controlling the energization of said windings in response to said comparison.

10. A motor controller according to claim 9 wherein said rotor further includes an annular-shaped iron ring disposed between said shaft and said rotor teeth to conduct flux between said stator poles.

11. A motor controller according to claim 9 wherein said magnet is a permanent magnet.

12. A motor controller according to claim 11 wherein said permanent magnet is a rare earth permanent magnet.

13. A motor controller according to claim 9 wherein said synthesized waveform is offset in the direction of perturbation.

14. An incremental motion motor controller for a cylindrical, rotary variable reluctance stepper motor comprising:

a cylindrical rotor having a plurality of longitudinally extending teeth with grooves therebetween, said rotor teeth having an angular pitch P and an angular width equal to P/2; and a cylindrical stator surrounding said rotor, said stator having two annular poles separated by an annular magnet, each stator pole having two sets of equally spaced, longitudinally extending teeth having an angular pitch P and an angular width equal to P/4, the sets of teeth in each stator pole being offset from each other by an angular amount equal to $(n\pm\frac{1}{2})P$, n being an integer, the two stator poles being offset from each other by an angular amount equal to $(m\pm\frac{1}{4})P$, m being an integer, the sets of teeth in each stator pole being separated by an annular windings, said windings characterized by no-motion signals having unperturbed waveforms and motion-dependent signals having perturbed waveforms;

waveform generator means for synthesizing waveforms modeled after said no-motion signals;

comparator means for comparing said synthesized waveforms with said motion-dependent waveforms; and means for controlling the energization of said windings in response to said comparison.

15. A motor controller according to claim 14 wherein said magnet is a permanent magnet.

16. A motor controller according to claim 15 wherein said permanent magnet is a rare earth permanent magnet.

17. An incremental motion motor controller for a variable reluctance stepper motor having at least two windings characterized by no-motion signals having unperturbed waveforms and motion-dependent signals having perturbed waveforms; said controller comprising:

waveform generator means for synthesizing waveforms modeled after said no-motion signals;

comparator means for comparing said synthesized waveforms with said motion-dependent waveforms; and means for controlling the energization of said windings in response to said comparison.

18. A motor controller according to claim 17 wherein said means for controlling the energization of said windings comprises:

means for determining the difference between a desired motor position and the present motor position;

means for determining the direction for stepping; and means for stepping said motor so as to reduce said difference to zero.

19. A motor controller according to claim 17 or 18 wherein said synthesized waveform is offset in the direction of perturbation.

20. A motor controller according to claim 17 or 18 wherein said no-motion signal has an exponential waveform.

21. A motor controller according to claim 17 or 18 wherein said no-motion signal has an exponential waveform of the general type $V=a(1-e^{-bt})$, where a and b are constants.

22. A motor controller according to claim 21 wherein said motion-dependent signal has a perturbed exponential waveform of the general type $V=a(1-e^{bt})$, where for some $t>0$, $b=b(t)$, first decreasing in value and then increasing in value.

23. An incremental motion motor controller for a DC variable reluctance stepper motor having first and second windings characterized by no-motion signals having unperturbed waveforms and motion-dependent signals having perturbed waveforms, said controller comprising:

first and second motor drive circuits connected, respectively, to said first and second windings for energizing same;

first waveform generator means for synthesizing waveforms modeled after said no-motion signals produced by said first winding;

second waveform generator means for synthesizing waveforms modeled after said no-motion signals produced by said second winding;

first comparator means connected to said first winding and to the output of said first waveform generator means for comparing the synthesized waveforms modeled after said no motion signals produced by said first winding with said motion-dependent waveforms produced by said first winding;

second comparator means connected to said second winding and to the output of said second waveform generator means for comparing the synthesized waveforms modeled after said no-motion signals produced by said second winding with said motion-dependent waveforms produced by said second winding; and processor means connected to said first and second motor drive circuits, said first and second waveform generator means and to said first and second comparator means for controlling the energization of said first and second windings in response to said comparisons.

24. A motor controller according to claim 23 wherein said processor means comprises:

means for determining the difference between a desired motor position and the present motor position;

means for determining the direction of stepping; and means for stepping said motor so as to reduce said difference to zero.

25. A motor controller according to claim 24 further including means for decelerating said motor when said difference has been reduced to a predetermined value.

26. A motor controller according to claim 23 or 24 wherein said first and second motor drive circuits each comprises a four transistor H-bridge connected across the winding, said four transistors being selectively energized in pairs under control of said processor means to effect current reversal through the winding and stepping of said motor.

27. A motor controller according to claim 23 or 24 wherein said first and second waveform generator means each comprises two waveform generators and wherein said first and second comparator means each comprises two comparators.

28. A motor controller according to claim 23 or 24 wherein said no-motion signals have exponential waveforms.

29. A motor controller according to claim 28 wherein said synthesized waveforms are offset in the direction of perturbation.

30. A motor controller according to claim 28 wherein said exponential waveforms are of the general type $V=a(1-e^{-bt})$, where a and b are constants.

31. A method for controlling a variable reluctance stepper motor having first and second windings characterized by no-motion signals having unperturbed waveforms and motion-dependent waveforms having perturbed waveforms, said method comprising the steps of:

(a) synthesizing waveforms modeled after said no-motion signals;

(b) comparing the synthesized waveforms with the motion-dependent waveforms; and (c) controlling the energization of said windings in response to said comparison.

32. The method of claim 31 or 30 further including the step of offsetting the synthesized waveforms in the direction of perturbation.

33. The method of claim 31 or 32 wherein said synthesized waveforms are exponential waveforms.

34. The method of claim 33 wherein said exponential waveforms are of the general type $V=a(1-e^{-bt})$, where a and b are constants.

35. A method for controlling a variable reluctance stepper motor having first and second windings characterized by no-motion signals having unperturbed waveforms and motion-dependent signals having perturbed waveforms, said method comprising the steps of:

(a) determining the difference between a desired motor position and the present position;

(b) determining the direction of stepping;

(c) synthesizing waveforms modeled after said no-motion signals;

(d) comparing the synthesized waveforms with the motion-dependent waveforms;

(e) controlling the energization of said windings in response to said comparisons; and (f) stepping said motor so as to reduce said difference to zero.

36. The method of claim 35 further including the step of decelerating said motor when said difference has been reduced to a predetermined value.

37. The method of claim 36 wherein said synthesized waveforms are exponential waveforms.

* * * * *